United States Patent
Kwon et al.

(10) Patent No.: US 12,377,797 B2
(45) Date of Patent: Aug. 5, 2025

(54) SOUND ABSORPTION BOARD FOR ELECTRIC VEHICLE

(71) Applicant: DAESOL AUSYS CO., LTD, Incheon (KR)

(72) Inventors: Min Ho Kwon, Incheon (KR); Jae Kyun Nam Gung, Incheon (KR); JeongHyeon Heo, Seoul (KR)

(73) Assignee: DAESOL AUSYS CO., LTD, Incheon (KR)

( * ) Notice: Subject to any disclaimer, the term of this patent is extended or adjusted under 35 U.S.C. 154(b) by 315 days.

(21) Appl. No.: 18/076,925

(22) Filed: Dec. 7, 2022

(65) Prior Publication Data
US 2023/0278507 A1    Sep. 7, 2023

(30) Foreign Application Priority Data

Mar. 4, 2022   (KR) ........................ 10-2022-0027827

(51) Int. Cl.
*B60R 13/08* (2006.01)
*B32B 3/12* (2006.01)
(Continued)

(52) U.S. Cl.
CPC ............ *B60R 13/0815* (2013.01); *B32B 3/12* (2013.01); *B32B 3/266* (2013.01); *B32B 5/02* (2013.01);
(Continued)

(58) Field of Classification Search
CPC ............ B60R 13/0815; B60R 13/0823; B60R 13/083; B60R 13/0838; B32B 3/12;
(Continued)

(56) References Cited

U.S. PATENT DOCUMENTS 8,951,623 B2 *   2/2015   Hoetzeldt ............... B32B 5/024
                                                          428/116
9,527,268 B2 *   12/2016   Preisler .................. B32B 27/12
(Continued)

FOREIGN PATENT DOCUMENTS

CN          110936635 A   *   3/2020
CN          210477991 U   *   5/2020     ............... B32B 3/12
(Continued)

OTHER PUBLICATIONS

English translation of CN 110936635 A, accessed Dec. 13, 24 via Espacenet, <https://worldwide.espacenet.com/patent/search/family/069909857/publication/CN110936635A?q=cn%20110936635> (Year: 2020).*

*Primary Examiner* — Jeremy A Luks
(74) *Attorney, Agent, or Firm* — BACON & THOMAS, PLLC

(57) ABSTRACT

Honeycomb structures, glass fiber mats, and polyurethane on both sides with respect to a perforated plate. A sound absorption hole is formed in at least one of the glass fiber mat and the polyurethane arranged on both sides of the honeycomb structure and passes through each cell, so that sound absorption performance in a high frequency band as well as a low frequency band can be improved using multilayer sound absorption characteristics. Noise passing through the honeycomb structure is changed to noise to be absorbed. Since the diameters of the sound absorption holes formed to pass through the honeycomb structures arranged on both sides of the perforated plate are different, a sound absorption band of a desired frequency may be easily adjusted. The sound absorption performance in a low frequency band of 1,000 Hz and a high frequency band of 5,000 Hz or higher can be improved.

5 Claims, 7 Drawing Sheets

(51) Int. Cl.
  *B32B 3/26* (2006.01)
  *B32B 5/02* (2006.01)
  *B32B 27/12* (2006.01)
  *B32B 27/40* (2006.01)

(52) U.S. Cl.
  CPC .............. *B32B 27/12* (2013.01); *B32B 27/40* (2013.01); *B60R 13/0838* (2013.01); *B32B 2250/40* (2013.01); *B32B 2262/101* (2013.01); *B32B 2307/102* (2013.01); *B32B 2307/72* (2013.01); *B32B 2605/00* (2013.01)

(58) Field of Classification Search
  CPC ........... B32B 3/266; B32B 5/02; B32B 27/12; B32B 27/40; B32B 2250/40; B32B 2262/101; B32B 2307/102; B32B 2307/72; B32B 2605/00
  See application file for complete search history.

(56) References Cited

U.S. PATENT DOCUMENTS

| 2017/0225425 | A1* | 8/2017 | Kwon | B32B 3/266 |
| 2022/0139364 | A1* | 5/2022 | Joshi | B29C 66/133 |
| | | | | 181/290 |

FOREIGN PATENT DOCUMENTS

| CN | 213675772 U | * | 7/2021 |
| EP | 3885124 A1 | * | 9/2021 |
| JP | 2521742 Y2 | * | 1/1997 |
| KR | 10-0774758 B1 | | 11/2007 |
| KR | 10-1007923 B1 | | 1/2011 |
| KR | 10-1302220 B1 | | 8/2013 |
| KR | 20180107424 A | * | 10/2018 |
| KR | 20190047786 A | * | 5/2019 |
| KR | 20200109405 A | * | 9/2020 |
| KR | 102162653 B1 | * | 10/2020 |

* cited by examiner

SOUND ABSORPTION BOARD FOR ELECTRIC VEHICLE

CROSS-REFERENCE TO RELATED APPLICATION

This application claims priority to and the benefit of Korean Patent Application No. 10-2022-0027827 filed on Mar. 4, 2022, the disclosure of which is incorporated herein by reference in its entirety.

BACKGROUND

1. Field of the Invention

The present disclosure relates to a sound absorption board for an electric vehicle, and more particularly, to a sound absorption board for an electric vehicle, in which honeycomb structures are arranged on both sides of a perforated plate, a glass fiber mat and polyurethane are applied to the outside of each honeycomb structure to form an integrated body, sound absorption holes are then formed in the glass fiber mat and the polyurethane arranged on at least one side among the glass fiber mats and the polyurethanes arranged on both sides with respect to the perforated plate to communicate with cells constituting the honeycomb structure, sound in different frequency bands may be absorbed through the honeycomb structures, and thus the sound absorption performance in frequency bands of a low frequency band of 1,000 Hz and a high frequency band of 5,000 Hz or higher mainly occurring in electric vehicles can be improved.

2. Discussion of Related Art

In general, in vehicles, sound absorption panels are used everywhere to maintain a comfortable traveling environment by reducing noise generated from components of the vehicles, such as engines and transmissions, or noise generated by lower parts of the vehicles during traveling. In this case, as in FIG. 1, the sound absorption panel may be used in the form of a board like a sound absorption panel of a dashboard D or a hood H without change or may be manufactured and used in a multilayer structure like a luggage board B or a luggage covering C, together with other layers. These sound absorption board is manufactured in various manners such as Patent Document 1 to Patent Document 3.

Patent Document 1: Korean Patent No. 10-1302220

Patent Document 1 relates to a high sound absorption ceiling panel for a vehicle, and more particularly, to a high sound absorption ceiling panel for a vehicle, including a polyurethane foam layer, reinforcement layers formed on both sides of the above-described polyurethane foam layer, a felt layer formed on an upper surface of the polyurethane foam layer on which the above-described reinforcement layer is formed, a film layer formed on a lower surface of the polyurethane foam layer on which the above-described reinforcement layer, and a non-woven fabric layer formed on a lower surface of the above-described film layer. Further, the high sound absorption ceiling panel may include a polyurethane foam layer, reinforcement layers formed on both surfaces of the above-described polyurethane foam layer, and felt layer formed on both surfaces of the above-described polyurethane foam layer on which the above-described reinforcement layers are formed.

Patent Document 2: Korean Patent No. 10-1007923

Patent Document 2 relates to a method of producing a polyurethane foam, which produces a polyurethane foam for a vehicle floor mat sound absorption material, by performing a urethane reaction with an isocyanate index of 0.5~2.0 using a polyol formed by mixing 90 to 97 wt % high molecular weight polyol having a number average molecular weight of 6,500 or more and 3 to 10 wt % low molecular weight polyol having a number average molecular weight of 1,000 or less, a resin premix consisting of diethanolamine, a foam stabilizer, a urethane catalyst, and a bubble-opening agent, and a modified polyisocyanate containing 25 to 40 wt % isocyanate obtained by mixing 50 to 82 wt % polymeric MDI with 15 to 30 wt % monomeric MDI, 2.5 to 10 wt % modified MDI, and 0.5 to 10 wt % TDI. In the polyurethane foam produced by this method, the density thereof is reduced to 50 to 60 $kg/m^2$, and thus a weight thereof can be light, and excellent sound absorption properties and excellent durability can be maintained.

Patent Document 3: Korean Patent No. 10-0774758

Patent Document 3 relates to a sound absorption structure of a dash panel for a vehicle, and particularly, to a sound absorption structure of a dash panel for a vehicle in which a wire is fixed to the dash panel that separates an engine room and a vehicle interior, wherein the sound absorption structure is configured such that a fixing protrusion protrudes from the wire in a direction toward the dash panel, the dash panel has a fixing groove to which the fixing protrusion is fixed, and as a separate fixture such as a protector is not required to fix the wire to the dash panel, noise, vibration, and harshness (NVH) performance is reinforced, and the product cost is reduced.

RELATED ART DOCUMENT

Patent Document (Patent Document 1) Korean Patent No. 10-1302220 (registered on Aug. 26, 2013)
(Patent Document 2) Korean Patent No. 10-1007923 (registered on Jan. 6, 2011)
(Patent Document 3) Korean Patent No. 10-0774758 (registered on Nov. 1, 2007)

SUMMARY OF THE INVENTION

Meanwhile, in recent years, as electric vehicles are widely supplied, as sound absorption boards used in existing vehicles are applied to the electric vehicles, the occurrence of the following problems will be described with reference to FIGS. 2 and 3. FIG. 2 is a graph obtained by measuring noise in a rear seat of an electric vehicle, wherein a vertical axis denotes rpm, and a horizontal axis denotes a frequency (Hz). Further, in FIG. 3, a horizontal axis denotes an rpm, and a vertical axis denotes noise (dB[A]).

In this way, in comparison of results of noise measured from the rear seat of the electric vehicle, as illustrated in FIGS. 2 and 3, it can be seen that a noise level is high at 3,000 rpm in a 24th order and at 7,800 rpm in a 47th order. When the noise level in this case is converted into a frequency (Hz), the frequency is about 1,200 Hz and 6,200 Hz. In particular, although the noise level at 6,200 Hz is lower, there is no engine noise in the electric vehicle, and thus high-frequency noise is a bigger problem in electric vehicle. Moreover, since most electric vehicles use a sound absorption board of an existing vehicle, sound absorption effect can be obtained to some extent for noise in a low band (about 1,200 Hz), but the sound absorption effect cannot be expected for noise in a high band (6,200 Hz or more).

The present disclosure is directed to providing a sound absorption board for an electric vehicle, in which honeycomb structures arranged on both sides of a perforated plate, a glass fiber mat and polyurethane are applied to both sides of each honeycomb structure, sound absorption holes are formed in the glass fiber mat and the polyurethane arranged on at least one among the glass fiber mats and the polyurethanes arranged on both sides with respect to the perforated plate and are configured to pass through each cell one by one, and thus sound absorption performance for noise in a high-frequency band as well as a low frequency band can be improved using multilayer sound absorption characteristics by which noise passing through each honeycomb structure is changed to noise in different frequency band to be absorbed.

The present disclosure is also directed to providing a sound absorption board for an electric vehicle, in which, as a diameter of a sound absorption hole formed to pass through the honeycomb structures arranged on both sides of the perforated plate is changed, a sound absorption band of the desired frequency may be easily adjusted, and thus sound absorption performance can be improved in a low frequency band of 1,000 Hz and a high frequency band of 5,000 Hz or higher mainly occurring in the electric vehicle.

The present disclosure is also directed to providing a sound absorption board for an electric vehicle, in which, as the sound absorption board is used as a sound absorption board for a dash panel, a sound absorption board for a rear seatback panel, a sound absorption board for a luggage board, a sound absorption board for a luggage cover, sound absorption performance for noise in a frequency band mainly occurring in the electric vehicle is improved, and thus a comfortable indoor environment can be achieved.

According to an aspect of the present disclosure, there is provided a sound absorption board for an electric vehicle, including a perforated plate (100) having a plurality of perforated holes (110) formed therein, two honeycomb structures (200) which are arranged in close contact with both surfaces of the perforated plate (100) and in which a distance between surfaces facing each other in a cell is in a range of 5 to 15 mm, a glass fiber mat (300) installed on a surface of each honeycomb structure 200, which is exposed to the outside, and having a surface density of 150 to 1,000 g/m$^2$, and polyurethane (400) applied on a surface of each glass fiber mat (300), which exposed to the outside, in a surface density of 150 to 1,000 g/m$^2$, wherein a plurality of sound absorption holes (410) are formed to pass through the glass fiber mat (300) and the polyurethane (400) formed on at least one side among the glass fiber mats (300) and the polyurethanes (400) formed on both sides with respect to the perforated plate (100), and the sound absorption holes (410) are each formed to communicate with one of cells constituting the honeycomb structure (200).

The honeycomb structure (200) may be made of paper, aluminum, or synthetic resin.

The perforated holes (110) formed in the perforated plate (100) and the sound absorption holes (410) formed in the polyurethane (400) and in the glass fiber mat (300) may be formed to have a diameter of 0.2 mm to 4 mm, and the respective perforated holes (110) and sound absorption holes (410) may have the same diameter or different diameters.

The sound absorption board for an electric vehicle may be formed to obtain sound absorption performance in the lower frequency band of 1,000 Hz and the higher frequency band of 5,000 Hz.

The sound absorption board for an electric vehicle may include a sound absorption board for a dash panel, a sound absorption board for a rear seatback panel, a sound absorption board for a luggage board, or a sound absorption board for a luggage cover.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 is a graph showing a result of converting a noise level according to the rpm change for a band in which noise is high in FIG. 2, wherein FIG. 3A shows a noise level of 3,000 rpm in a 24th order, and FIG. 3B shows a noise level of 7,800 rpm in a 48$^{th}$ order;

FIG. 4 is a view illustrating a layer structure of a sound absorption board for an electric vehicle according to the present disclosure, wherein FIG. 4A is a cross-sectional view of the sound absorption board in which sound absorption holes are formed in both sides of the sound absorption board, FIG. 4B is a plan view of the sound absorption board in which the sound absorption holes are formed in both sides of the sound absorption board, and FIG. 4C is an enlarged view illustrating a configuration of the sound absorption board in which sound absorption holes are formed only in one side of the sound absorption board;

DETAILED DESCRIPTION OF THE INVENTION

Figure 1:
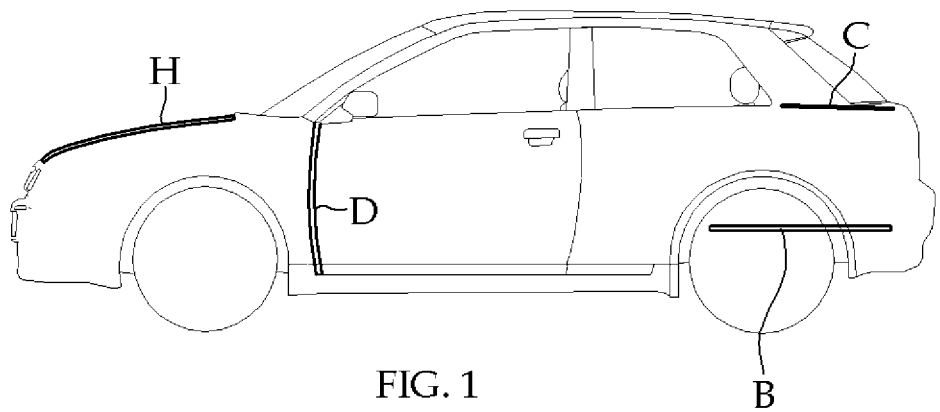
FIG. 1 is a side view of a vehicle illustrating a location of a sound absorption board used in the vehicle.

Hereinafter, exemplary embodiments of the present disclosure will be described in more detail with reference to the accompanying drawings. Prior to this, terms or words used in the present specification should not be interpreted as being limited to usual or dictionary meanings and should be interpreted as meanings and concepts corresponding to the technical spirit of the present disclosure according to the principle that the inventor may properly define the concepts of the terms in order to describe his/her own invention in the best way.

Thus, since the embodiments described in the present specification and configurations illustrated in the drawings are merely the most exemplary embodiments of the present disclosure and do not represent all the technical spirit of the present disclosure, it should be understood that various equivalents and variations that may replace the embodiments and the configurations are present at filling of the present application.

[Configuration of Sound Absorption Board for Electric Vehicle]

As illustrated in FIGS. 4 to 7, a sound absorption board for an electric vehicle according to the present disclosure includes a perforated plate 100, two honeycomb structures 200, a glass fiber mat 300 formed outside each of the honeycomb structures 200, and polyurethane 400.

In particular, as one sound absorption hole 410 is formed to pass through each cell constituting the honeycomb structure 200 in the glass fiber mat 300 and the polyurethane 400 formed on at least one side among the glass fiber mats 300 and the polyurethanes 400 formed on both sides with respect to the perforated plate 100, the two honeycomb structures 200 each perform a resonance action, and thus sound absorption performance can be further improved.

In this case, as the sound absorption holes 410 have different diameters so that the two honeycomb structures 200 absorb sound in different frequency bands, the sound absorption performance in a lower frequency band of 1,000 Hz and a higher frequency band of 5,000 Hz or higher normally occurring in an electric vehicle is improved, and thus a comfortable driving environment can be achieved.

Further, the sound absorption board according to the present disclosure may replace sound absorption materials such as a sound absorption board for a dash panel, a sound absorption board for a rear seatback panel, a sound absorption board for a luggage board, and a sound absorption board for a luggage cover, and thus the sound absorption performance can be improved throughout the electric vehicle.

Hereinafter, these configurations will be described in more detail with reference to the accompanying drawings.

A. Perforated Pplate

Figure 4:
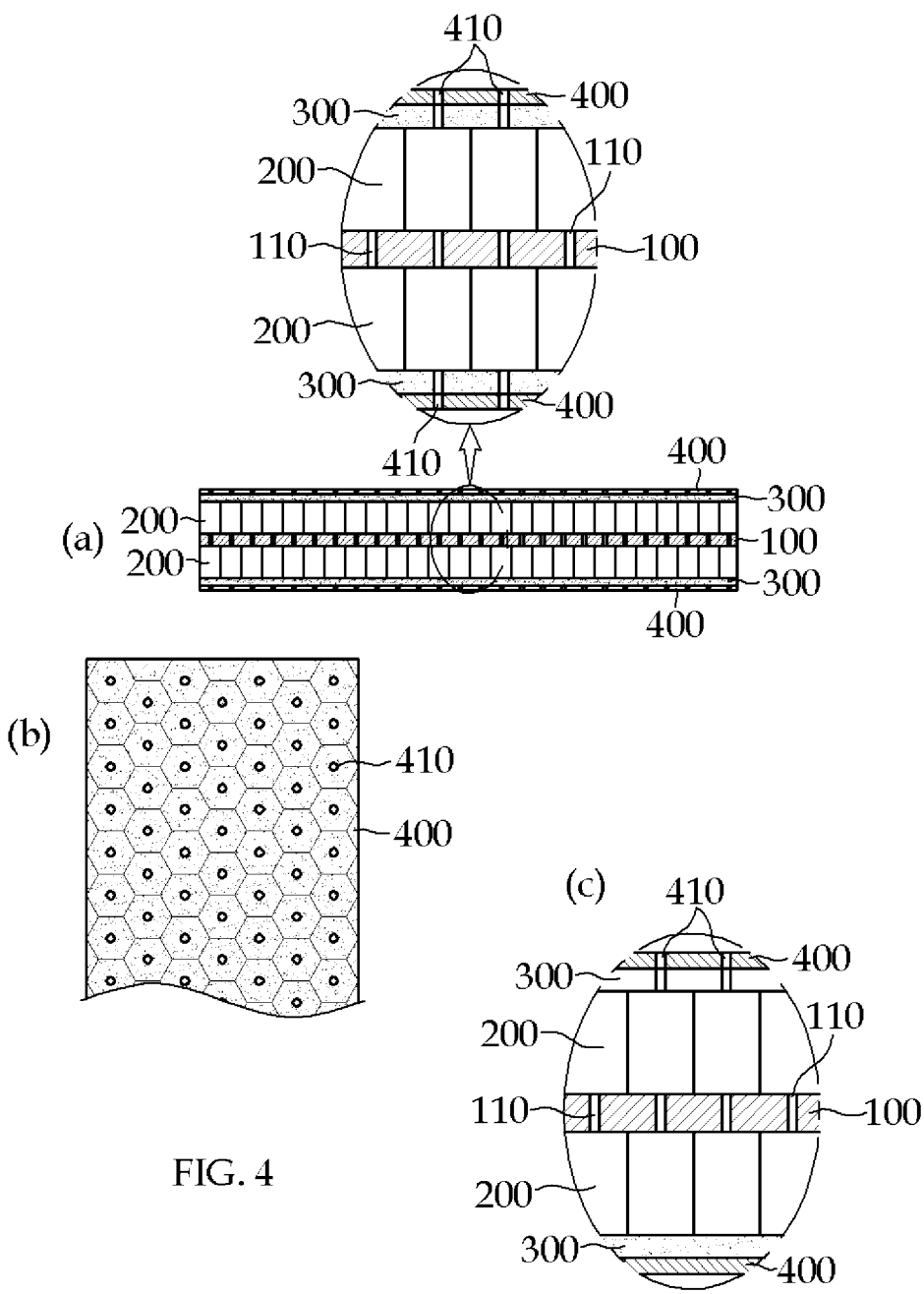

As illustrated in FIG. 4, the perforated plate 100 in which perforated holes 110 pass through from one surface thereof is formed. In this case, the perforated hole 110 is located in each hexagonal column-shaped cell constituting the honeycomb structures 200 which are installed in close contact with both surfaces of the perforated plate 100 and will be described below.

In an exemplary embodiment of the present disclosure, it is preferable that the perforated hole 110 is located at a center of the cell when the perforated plate 100 and the honeycomb structure 200 are integrally formed to each other in this way. This is to improve the sound absorption performance by performing a sound absorption action in the cells while noise moves in and out of the cells located on both sides through the perforated hole 110. The perforated hole 110 is formed to have a diameter d of 0.2 to 4 mm and may be manufactured to have the same diameter as or a different diameter from the diameter of another sound absorption hole 410 which will be described below.

Meanwhile, in an exemplary embodiment of the present disclosure, the perforated plate 100 may be made of any material as long as the material performs the sound absorption action through the perforated hole 110 in addition to a sound insulation action between the two honeycomb structures 200. Examples of the material include paper, aluminum, or synthetic resin.

In the perforated plate 100 made in this way, as illustrated in FIG. 4, the honeycomb structures 200 are integrally formed on both surfaces of the perforated plate 100. In this case, the perforated plate 100 may be integrally formed by applying heat and pressure while inserted between the two honeycomb structures 200, which will be described below, in a state in which a surface of the perforated plate 100 is laminated and integrally coated with adhesive or the like.

B. Honeycomb Structure

Figure 5:
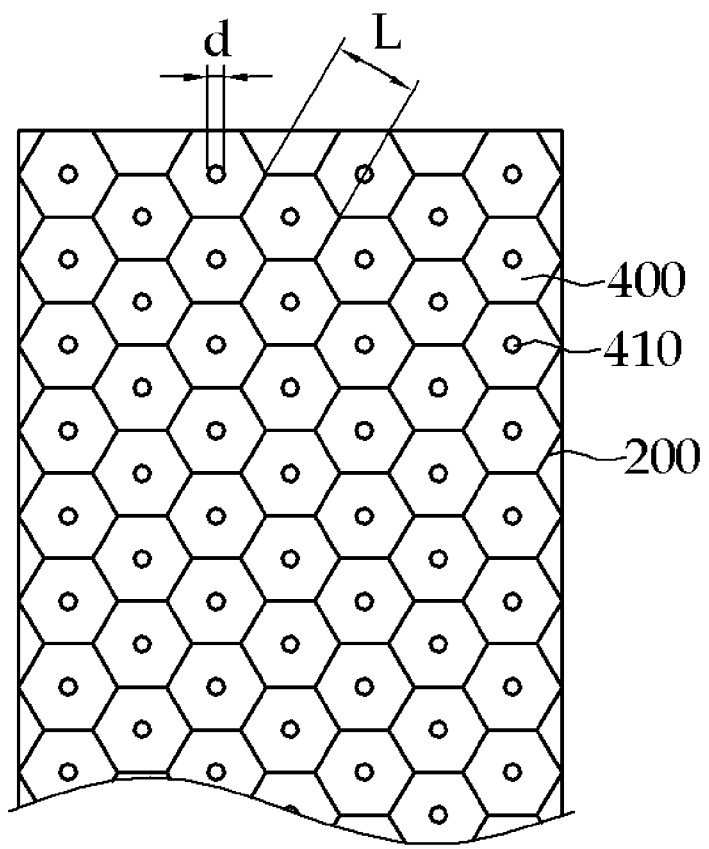
FIG. 5 is a plan view illustrating a honeycomb structure according to the present disclosure.

As illustrated in FIGS. 4 and 5, the honeycomb structure 200 uses one manufactured by a conventional technology in which hollow cells formed in a regular hexagonal column shape are connected without any gaps. In this case, it is preferable that the honeycomb structure 200 is manufactured to have sufficient structural rigidity even while the weight of the sound absorption board is reduced because the honeycomb structure 200 is light. Accordingly, it is most preferable that the honeycomb structure 200 in which a distance L between surfaces facing each other is in the range of 5 to 15 mm is used.

Further, in an exemplary embodiment of the present disclosure, the honeycomb structure 200 may be made of any material as long as the material is light and is capable of reinforcing structural rigidity, and examples of the material include paper, aluminum, and synthetic resin.

As illustrated in FIG. 4, it is preferable that the honeycomb structures 200 are attached to both sides of the perforated plate 100 and are integrally attached using a laminating technique.

C. Glass Fiber Mat

As illustrated in FIG. 4, the glass fiber mat 300 is installed in close contact with a surface, which is exposed to the outside, of each honeycomb structure 200. The glass fiber mat 300 not only reinforces the rigidity of the sound absorption board according to the present disclosure but also improves the sound absorption performance using a sound absorption performance of a glass fiber itself.

It is preferable that the glass fiber mat 300 having a surface density of 150 to 1,000 g/m$^2$ to obtain the rigidity reinforcement and the sound absorption performance while a weight thereof is not too heavy is used.

The glass fiber mat 300 made in this way is integrally attached to the honeycomb structure 200 while the polyurethane 400, which is applied onto the glass fiber mat 300 and will be described below, is permeated. Further, the sound absorption hole 410 is formed in the glass fiber mat 300 while overlapping the polyurethane 400, which will be described below, and the sound absorption hole 410 is formed to pass through each cell constituting the honeycomb structure 200.

D. Polyurethane

As illustrated in FIG. 4, a surface of the glass fiber mat 300, which is exposed to the outside, is coated with the polyurethane 400. In this case, the polyurethane 400 performs an adhesive function by being attached to a cell edge of the honeycomb structure 200 while permeating the glass fiber mat 300, and finishes an inlet portion of the cell constituting the honeycomb structure 200 to form an independent air layer.

In an exemplary embodiment of the present disclosure, as the polyurethane 400 is applied in a surface density of 150 to 1,000 g/m$^2$ so that the glass fiber mat 300 is firmly attached to the honeycomb structure 200.

Meanwhile, in an exemplary embodiment of the present disclosure, as illustrated in FIGS. 4 and 5, the sound absorption hole 410 may be formed through the polyurethane 400. The sound absorption hole 410 is formed so that noise moves from the outside of the sound absorption board according to the present disclosure into the cell constituting the honeycomb structure 200, thereby achieving a sound absorption action.

Further, in an exemplary embodiment of the present disclosure, it is preferable that one sound absorption hole 410 is formed to pass through each cell constituting the honeycomb structure 200. However, it is most preferable that the sound absorption hole 410 is formed to be located at a center of the cell. In this case, it is preferable that the sound absorption hole 410 is formed to pass through both the glass fiber mat 300 and the polyurethane 400.

Further, the sound absorption hole 410 is formed to have a diameter d of 0.2 to 4 mm and may be manufactured to have the same diameter as or a different diameter from the diameter of another perforated hole 110 which has been described above. Further, the sound absorption hole 410 formed in each honeycomb structure 200 may be formed to have the same diameter and may be configured to absorb noise having frequencies in the same band. However, it is most preferable that the diameter of the sound absorption hole 410 is changed so that noise having frequencies in different bands can be absorbed, and thus noise having a frequency in a low frequency band and a high frequency band can be simultaneously absorbed.

Finally, as illustrated in FIG. 4A, an example of a state in which the sound absorption holes 410 are formed in all the glass fiber mats 300 and the polyurethanes 400 formed on both sides with respect to the perforated plate 100 is illustrated. However, as illustrated in FIG. 4C, the sound absorption hole 410 may be formed to pass through only the glass fiber mat 300 and the polyurethane 400 located on any one side with respect to the perforated plate 100, and in this case, it is preferable that, as the sound absorption board is installed so that the sound absorption hole 410 is located on a noise source side, the noise can be effectively absorbed in the cell.

(Sound Absorption Characteristics of Sound Absorption Board

Figure 6:
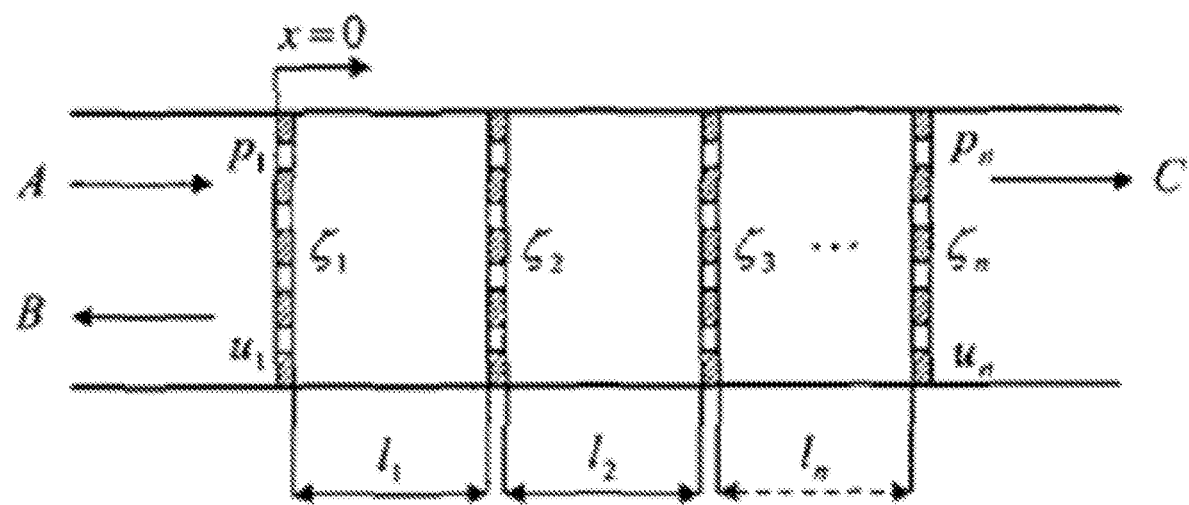
FIG. 6 is a conceptual view for describing a sound absorption principle of a multilayer structure constituting the sound absorption board according to the present disclosure.

Sound absorption characteristics according to the present disclosure will be described below with reference to FIGS. 6 and 7. As illustrated in FIG. 4A, in the sound absorption board according to the present disclosure, the sound absorption holes 110 are formed and the other sound absorption holes 410 are formed with respect to the perforated plate 100 so that the honeycomb structures 200 are integrally formed to have a space, and thus the sound is absorbed in a multilayer structure. FIG. 6 is a cross-sectional view of a multilayer structure for describing the sound absorption characteristics of the multilayer structure of FIG. 4. When the sound absorption characteristics of the multilayer structure is calculated using the same, the sound absorption characteristics may be expressed by [Equation 1] to [Equation 3].

Here, in the multilayer structure disposed in a panel form, a panel layer may be expressed as a P matrix expressed by [Equation 1] below. Here, a symbol "ζ" denotes an intrinsic acoustic impedance.

$$\begin{bmatrix} P_{11} & P_{12} \\ P_{21} & P_{22} \end{bmatrix} = \begin{bmatrix} 1 & \zeta \\ 0 & 1 \end{bmatrix}$$ [Equation 1]

Further, in the multilayer structure, a cavity between the panels, that is, a honeycomb cell, is expressed as an S matrix expressed by [Equation 2] below. In this case, a symbol "k" denotes a wave number (rad/m), a symbol "l" denotes a thickness of the honeycomb, a symbol "j" denotes an imaginary part of the impedance, a symbol "$\rho_0$" denotes an air density (kg/m3), and a symbol "$c_0$" denotes a sound speed.

$$\begin{bmatrix} S_{11} & S_{12} \\ S_{21} & S_{22} \end{bmatrix} = \begin{bmatrix} \cos kl & (j\rho_0 c_0)\sin kl \\ (j/\rho_0 c_0)\sin kl & \cos kl \end{bmatrix}$$ [Equation 2]

Meanwhile, a T matrix representing a total sound absorption rate of the multilayer structure using the P matrix and the S matrix may be expressed by [Equation 3] below.

$$[T]=[P]_1 \cdot [S]_1 \cdot [P]_2 \cdot [S]_2 \cdots [S]_{n-1} \cdot [P]_n$$ [Equation 3]

Figure 7:
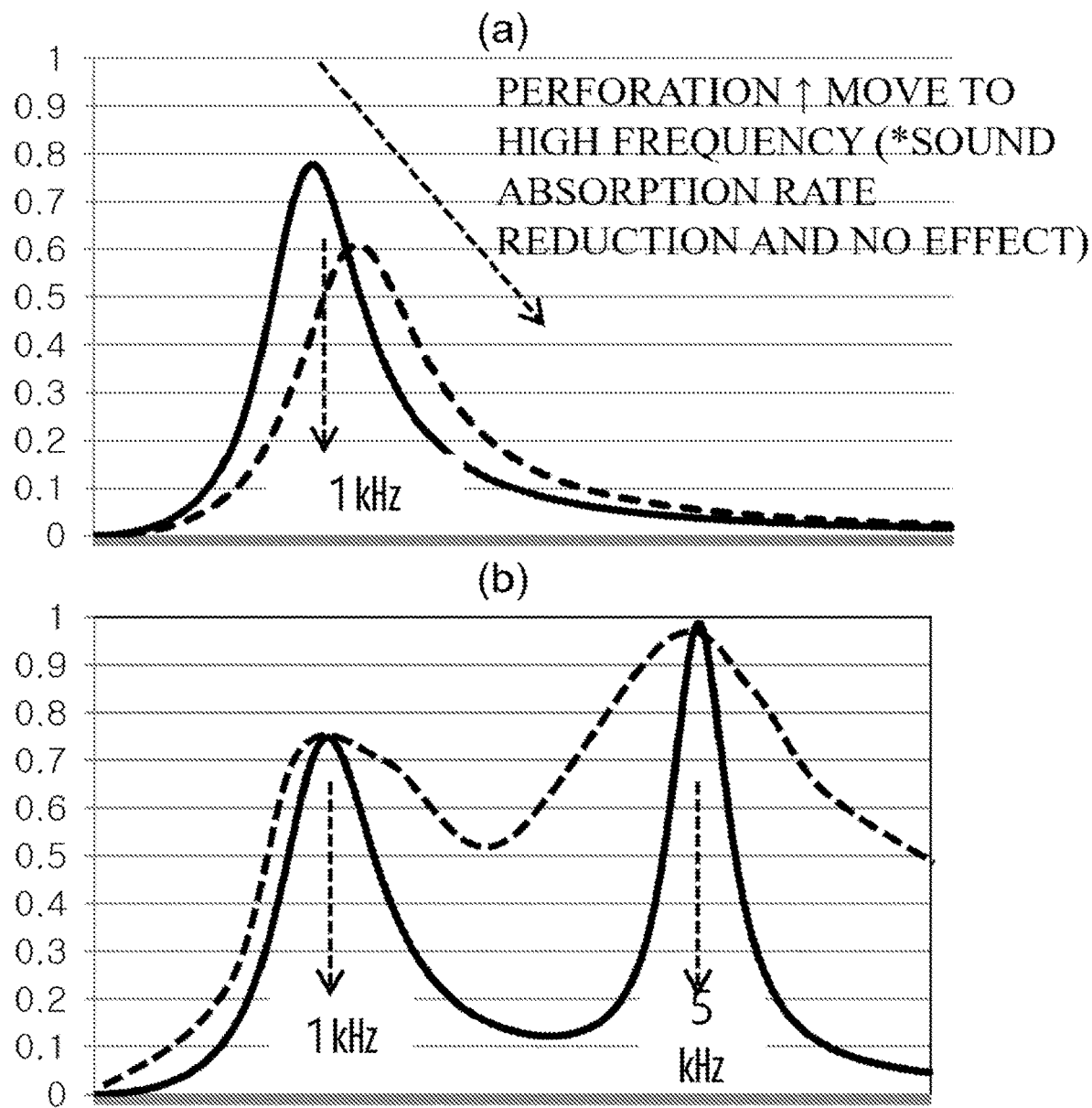
FIG. 7 is a set of graphs showing sound absorption performances obtained in a frequency band when a single-layer structure is perforated (see FIG. 7A) and when the multilayer structure is perforated according to the present disclosure (see FIG. 7B).

For the sound absorption rate expressed in this way, with respect to a change in a frequency Hz, graphs showing sound absorption rates of a comparative example in which a single perforated layer is formed (see FIG. 7A) and an example in which a perforated multilayer is formed (see FIG. 7B) are illustrated in FIG. 7 below. In FIG. 7, a horizontal axis denotes the frequency, and a vertical axis denotes a sound absorption rate.

As a result, in the comparative example, as illustrated in FIG. 7A, in the single-layer structure, a sound absorption effect is achieved only at one peak (a low frequency band) and only slight sound absorption adjustment is also made in the low frequency band even when a location of the sound absorption hole is adjusted, and thus the sound absorption performance cannot be obtained in the high frequency band. However, in the embodiment, as illustrated in FIG. 7B, it can be seen that peaks occur in the low frequency band and the high frequency band, and it can be seen that the sound absorption performance in the low frequency band and the high frequency band can be improved through the adjustment of the sound absorption hole.

In particular, by adjusting the locations and number of the sound absorption holes, an interval between the sound absorption holes, and the like, in FIG. 7, as the sound absorption rate is changed from the black line to the broken line, the sound absorption performance can be adjusted.

Figure 2:
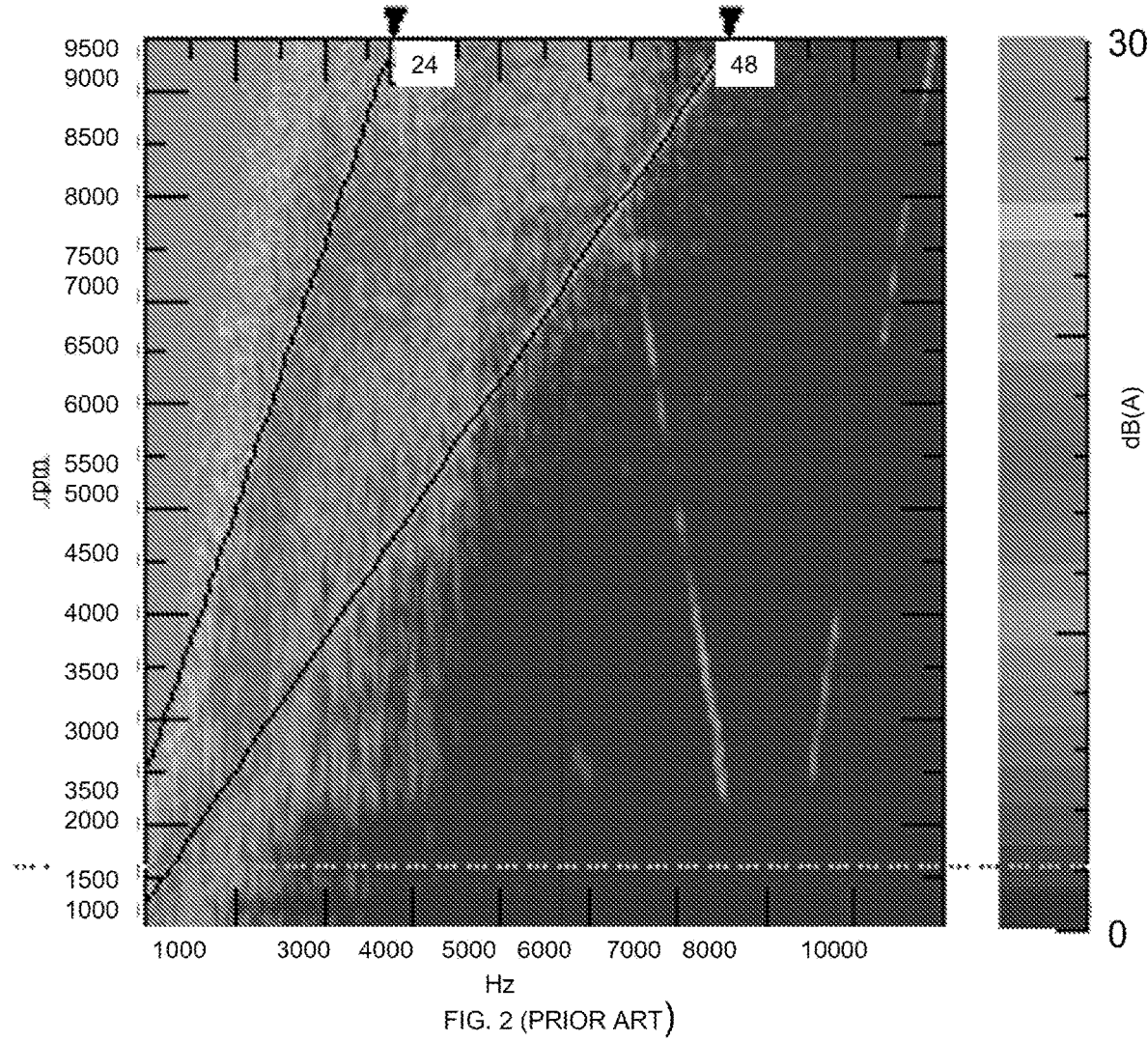
FIG. 2 is a graph showing a result of measuring a frequency change according to an rpm change in a rear seat of an electric vehicle after a sound absorption board according to a related art is mounted on the electric vehicle.
Figure 3:
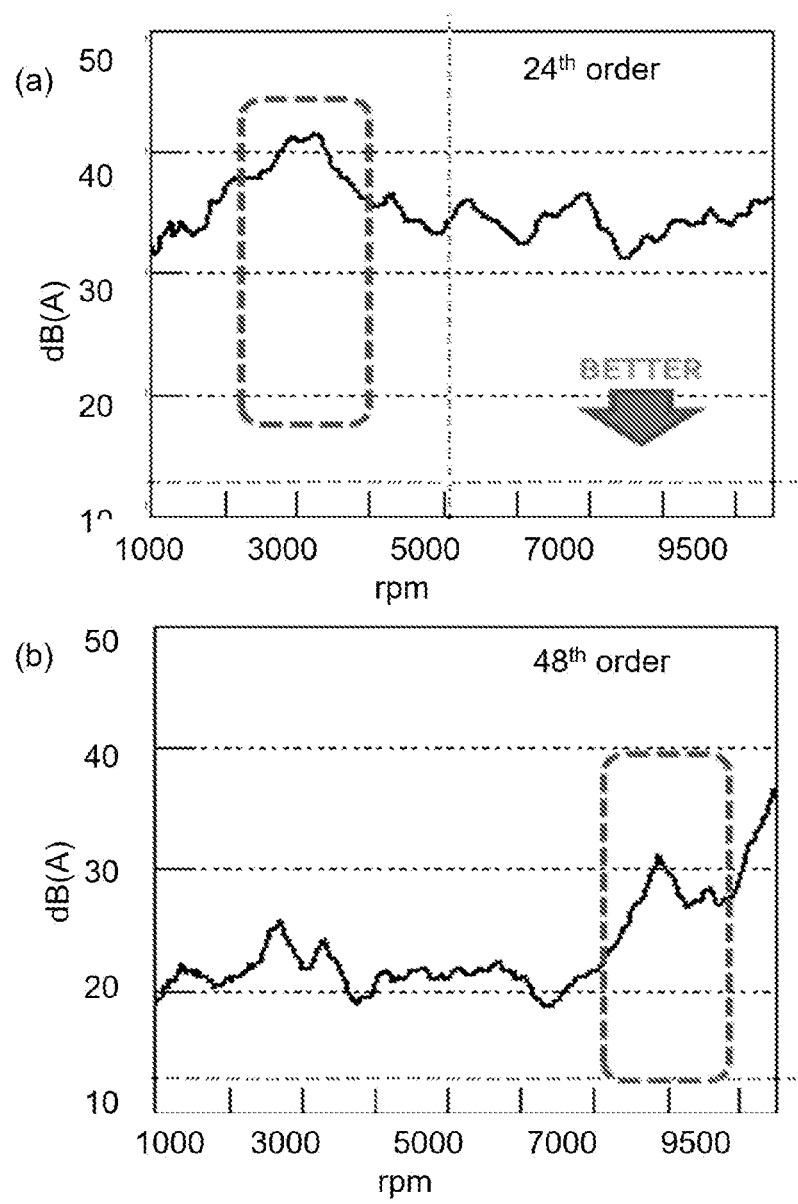

As illustrated in FIG. 7B, in the multilayer structure, the sound absorption performances in the lower frequency band and the higher frequency band can be obtained using the diameter or the like of the sound absorption hole. As illustrated in FIGS. 2 and 3, it is most preferable that the sound absorption board according to the exemplary embodiment of the present disclosure is manufactured and used so that the sound absorption performance can be obtained in the lower frequency band of 1,000 Hz and the higher frequency band of 5,000 Hz or higher, which drivers and passengers may mainly feel as noise, among a frequency band occurring when the electric vehicle travels.

Finally, the sound absorption board for an electric vehicle according to the present disclosure is applied to a sound absorption board for a dash panel, a sound absorption board for a rear seatback panel, a sound absorption board for a luggage board, and a sound absorption board for a luggage cover, and the sound absorption board according to the present disclosure may be used as itself or used as a sound absorption material in the multilayer structure, and thus the sound absorption performance can be further improved throughout the electric vehicle.

A sound absorption board for an electric vehicle according to the present disclosure has the following effects.

(1) Honeycomb structures are arranged on both sides of a perforated plate to form an integral body, a glass fiber mat and polyurethane are applied to the outside of each honeycomb structure, a sound absorption hole is formed to pass through each cell in the polyurethane and the glass fiber mat formed on at least one side among the polyurethanes and the glass fiber mats formed on both sides of the honeycomb structure, and thus sound absorption performance of a sound absorption board can be improved by each honeycomb structure that provides sound absorption performance.

(2) In this case, since the sound absorption performance that can be obtained in each honeycomb structure is changed according to the diameter of a sound absorption hole, the sound absorption holes formed in the two honeycomb structures are formed such that the diameters thereof are different from each other, and thus sound absorption performance in different frequency bands can be obtained.

(3) Accordingly, the sound absorption performance in the lower frequency band of 1,000 Hz and the higher frequency band of 5,000 Hz or higher mainly occurring in the electric vehicle can be obtained, and thus the sound absorption performance in the electric vehicle can be further improved.

(4) Meanwhile, since the sound absorption board can replace a sound absorption material, the sound absorption board can be used as a sound absorption board for a dash panel, a sound absorption board for a rear seatback panel, a sound absorption board for a luggage board, or a sound absorption board for a luggage cover, which is required in the electric vehicle, and thus, the sound absorption performance can be improved even while the sound absorption board is used in various manners.

What is claimed is:

1. A sound absorption board for an electric vehicle, comprising:
    a perforated plate having a plurality of perforated holes formed therein and two main surfaces on opposite sides of the perforated plate, the two main surfaces including a first main surface and a second main surface spaced from the first main surface;
    two honeycomb structures, a first of which is arranged in close contact with the first main surface of the perforated plate and a second of which is arranged in close contact with the second main surface of the perforated plate, each said honeycomb structure constituting a plurality of cells, each said cell having side surfaces extending transversely to the main surfaces of the perforated plate, and in which a distance between said side surfaces facing each other in a eell respective one of said cells is in a range of 5 to 15 mm;
    a glass fiber mat installed on a surface of each honeycomb structure, which is exposed to an outside of the sound absorption board, and having a surface density of 150 to 1,000 $g/m^2$; and
    polyurethane applied on an outside surface of each glass fiber mat and having a surface density of 150 to 1,000 $g/m^2$,
    wherein a plurality of sound absorption holes are formed to pass through at least one of the glass fiber-mats and the polyurethane applied to said at least one of the glass fiber mats, and the sound absorption holes are each formed to communicate with one and only one of cells constituting the honeycomb structure.

2. The sound absorption board of claim 1, wherein said honeycomb structures are made of paper, aluminum, or synthetic resin.

3. The sound absorption board of claim 1, wherein the perforated holes formed in the perforated plate and the sound absorption holes formed in the polyurethane and the glass fiber mat are formed to have a diameter of 0.2 mm to 4 mm,
    the respective perforated holes and sound absorption holes have the same diameter or different diameters.

4. The sound absorption board of claim 1, wherein the sound absorption board for an electric vehicle is formed to obtain sound absorption performance in the frequency band of 1,000 Hz and the higher frequency band of 5,000 Hz.

5. The sound absorption board of claim 4, wherein the sound absorption board for an electric vehicle includes a sound absorption board for a dash panel, a sound absorption board for a rear seatback panel, a sound absorption board for a luggage board, or a sound absorption board for a luggage cover.

* * * * *